(12) United States Patent
Yohe et al.

(10) Patent No.: US 8,783,447 B1
(45) Date of Patent: Jul. 22, 2014

(54) ARTICLE METERING DEVICE

(71) Applicant: Dyco, Inc., Bloomsburg, PA (US)

(72) Inventors: Peter D. Yohe, Bloomsburg, PA (US); Thomas M. Zurewich, Orangeville, PA (US)

(73) Assignee: Dyco, Inc., Bloomsburg, PA (US)

( * ) Notice: Subject to any disclaimer, the term of this patent is extended or adjusted under 35 U.S.C. 154(b) by 0 days.

(21) Appl. No.: 13/956,544

(22) Filed: Aug. 1, 2013

Related U.S. Application Data

(60) Provisional application No. 61/794,205, filed on Mar. 15, 2013.

(51) Int. Cl.
*B65G 47/00* (2006.01)
(52) U.S. Cl.
CPC .................................... *B65G 47/00* (2013.01)
USPC ..................... 198/841; 198/863.3; 198/626.5; 198/814
(58) Field of Classification Search
USPC ............................. 198/841, 836.3, 626.5, 814
See application file for complete search history.

(56) References Cited

U.S. PATENT DOCUMENTS

| | | | | |
|---|---|---|---|---|
| 4,325,480 A * | 4/1982 | Butt | .............................. | 198/841 |
| 7,015,400 B2 * | 3/2006 | Olafsson et al. | .............. | 177/119 |
| 7,717,254 B2 * | 5/2010 | Brackley et al. | ........... | 198/836.3 |
| 7,878,323 B2 * | 2/2011 | Van Rees et al. | ............. | 198/850 |
| 2008/0190742 A1 * | 8/2008 | Zmaj | ............................. | 198/831 |

* cited by examiner

*Primary Examiner* — Mark A Deuble
(74) *Attorney, Agent, or Firm* — McNees Wallace & Nurick LLC

(57) ABSTRACT

An article metering device for use in a conveyor system includes a continuous belt, a body, a motor operatively connected to the body for drivingly moving the belt and a guide belt. The belt guide has opposed ends operatively connected to and continuously supported by the body in at least two directions, the belt guide having a support surface for continuously supporting the belt between the opposed ends. The belt guide has a different coefficient of expansion/contraction than the body. The belt guide is operatively connected to the body such that the belt guide can freely expand/contract relative to the body without distorting the support surface. The belt guide extends between adjacent conveyor sections of the conveyor system or between different positions of a conveyor section of the conveyor system.

20 Claims, 15 Drawing Sheets

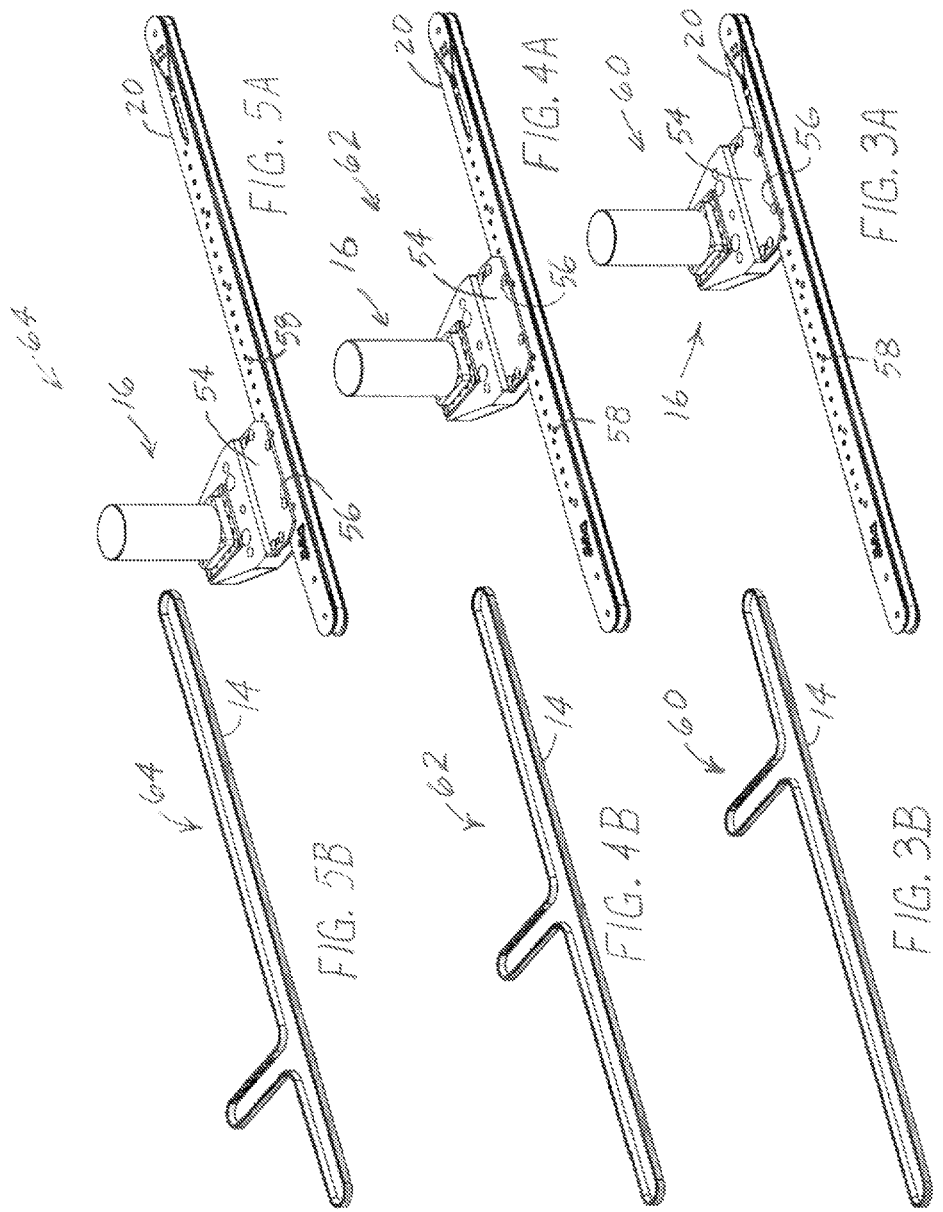

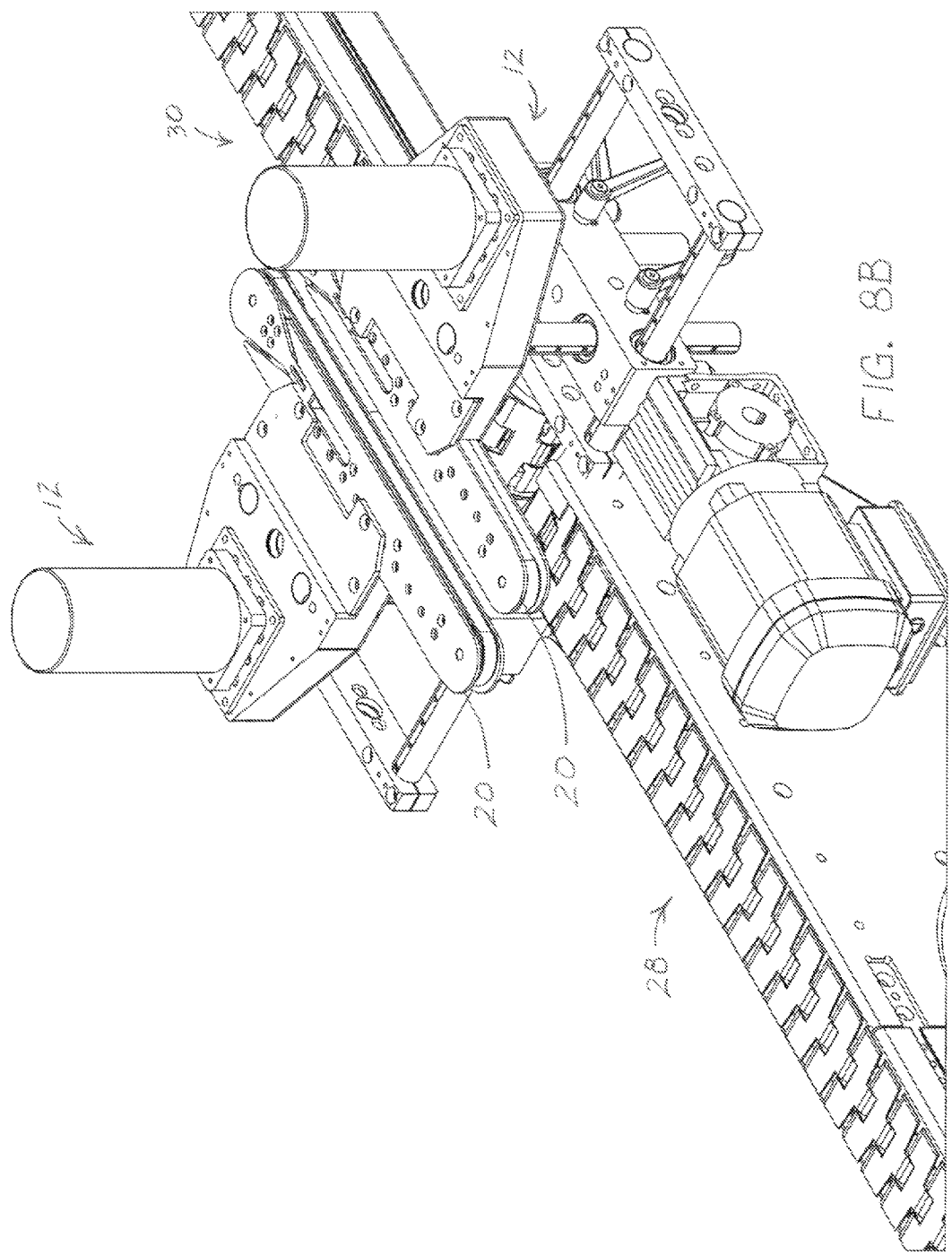

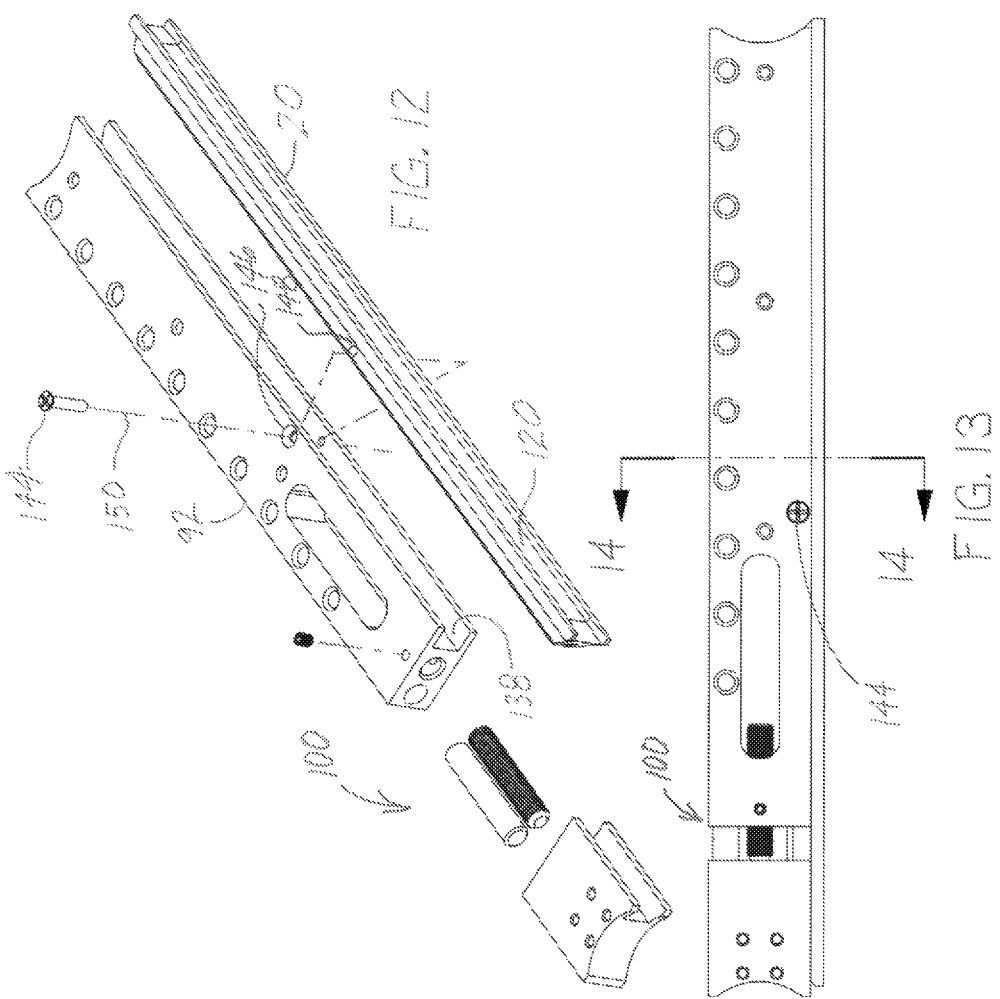

ARTICLE METERING DEVICE

FIELD OF THE INVENTION

The present invention generally relates to conveyor systems, and more particularly, to an article metering device usable with conveyor systems.

BACKGROUND

In the manufacture and packaging of articles, such as blow-molded articles, conveyor sections are often used to convey the articles between the manufacturing/packaging stations. Article metering devices or article throttle devices are positioned between adjacent conveyor sections to stabilize the articles during transfer across tabletop conveyor sections, article braking, article spacing, controlling line speed, as well as combining and dividing the articles. Conventional article metering devices are difficult to adjust to accommodate articles of different sizes conveyed between adjacent conveyor sections. Generally, conventional article metering devices are not usable to convey small articles, such as ophthalmic medicine containers or fingernail polish containers, due at least in part to the inability to provide continuous support for the articles while conveyed between adjacent conveyor sections. Further, conventional article metering devices are only usable between a single configuration of adjacent conveyor sections. That is, if an alteration between adjacent conveyor sections is required, such as an increase or decrease in distance between adjacent conveyor sections, a new article metering device must be provided.

Accordingly, there is a need for an article metering device and method for conveying articles between adjacent conveyor sections that does not suffer from the above-mentioned deficiencies.

SUMMARY OF THE INVENTION

In an exemplary embodiment, an article metering device for use in a conveyor system includes a continuous belt, a body, a motor operatively connected to the body for drivingly moving the belt and a guide belt. The belt guide has opposed ends operatively connected to and continuously supported by the body in at least two directions, the belt guide having a support surface for continuously supporting the belt between the opposed ends. The belt guide has a different coefficient of expansion/contraction than the body. The belt guide is operatively connected to the body such that the belt guide can freely expand/contract relative to the body without distorting the support surface. The belt guide extends between adjacent conveyor sections of the conveyor system or between different positions of a conveyor section of the conveyor system.

In another exemplary embodiment, a pair of opposed article metering devices for use in a conveyor system, each article metering device includes a continuous belt, a body, a motor operatively connected to the body for drivingly moving the belt and a belt guide. The belt guide has opposed ends operatively connected to and continuously supported by the body in at least two directions, the belt guide having a support surface for continuously supporting the belt between the opposed ends. The belt guide has a different coefficient of expansion/contraction than the body. The belt guide is operatively connected to the body such that the belt guide can freely expand/contract relative to the body without distorting the support surface. The belt guide extends between adjacent conveyor sections of the conveyor system or between different positions of a conveyor section of the conveyor system. The opposed continuous belts of the pair of opposed article metering devices continuously support and meter articles between adjacent conveyor sections of the conveyor system or between different positions of a conveyor section of the conveyor system.

In a further embodiment, a method of conveying articles along a conveyor system includes providing a continuous belt, a body, a motor operatively connected to the body for drivingly moving the belt; and a belt guide having opposed ends operatively connected to and continuously supported by the body in at least two directions. The belt guide has a support surface for continuously supporting the belt between the opposed ends. The belt guide has a different coefficient of expansion/contraction than the body, the belt guide operatively connected to the body such that the belt guide can freely expand/contract relative to the body without distorting the support surface. The belt guide extends between adjacent conveyor sections of the conveyor system or between different positions of a conveyor section of the conveyor system. The method further includes actuating the motor for conveying articles between the conveyor sections or between different positions of a conveyor section of the conveyor system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIGS. 3A and 3B are corresponding partial upper perspective views of an exemplary device and a corresponding belt each positioned in a first position according to the disclosure.

FIGS. 4A and 4B are corresponding partial upper perspective views of an exemplary device and a corresponding belt each positioned in a second position according to the disclosure.

FIGS. 5A and 5B are corresponding partial upper perspective views of an exemplary device and a corresponding belt each positioned in a third position according to the disclosure.

FIG. 8B is a partial upper perspective view of an exemplary device according to the disclosure.

FIG. 12 is an exploded upper perspective view of a base portion of the guide belt of FIG. 11 according to the disclosure.

FIG. 13 is a plan view of an assembled base portion of the guide belt of FIG. 12 according to the disclosure.

DETAILED DESCRIPTION

Specific embodiments of apparatus and method for conveying and metering articles according to the disclosure are described below with reference to the drawings.

Figure 1:
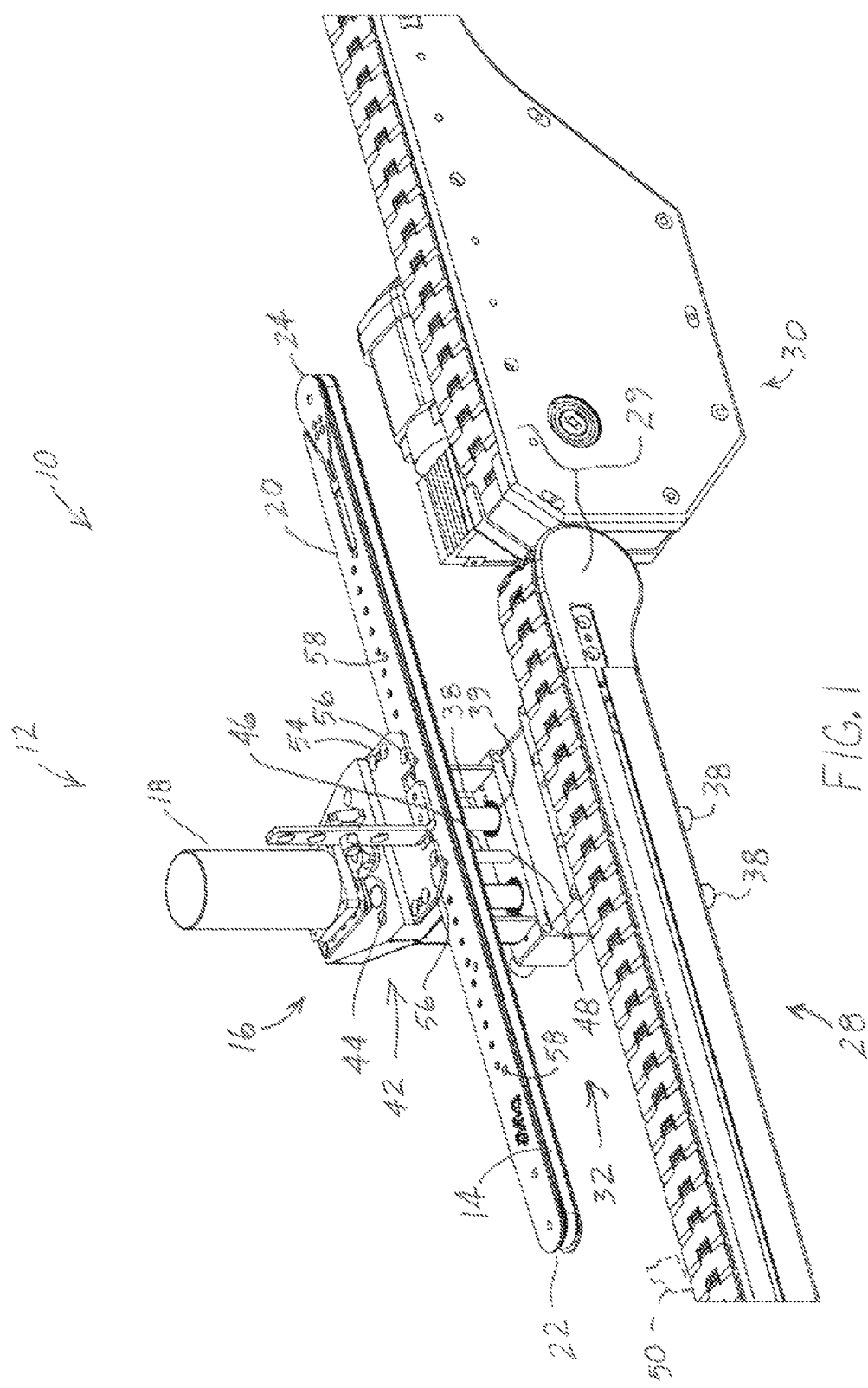
FIGS. 1 and 2 are partial upper perspective views of an exemplary device according to the disclosure.
Figure 2:
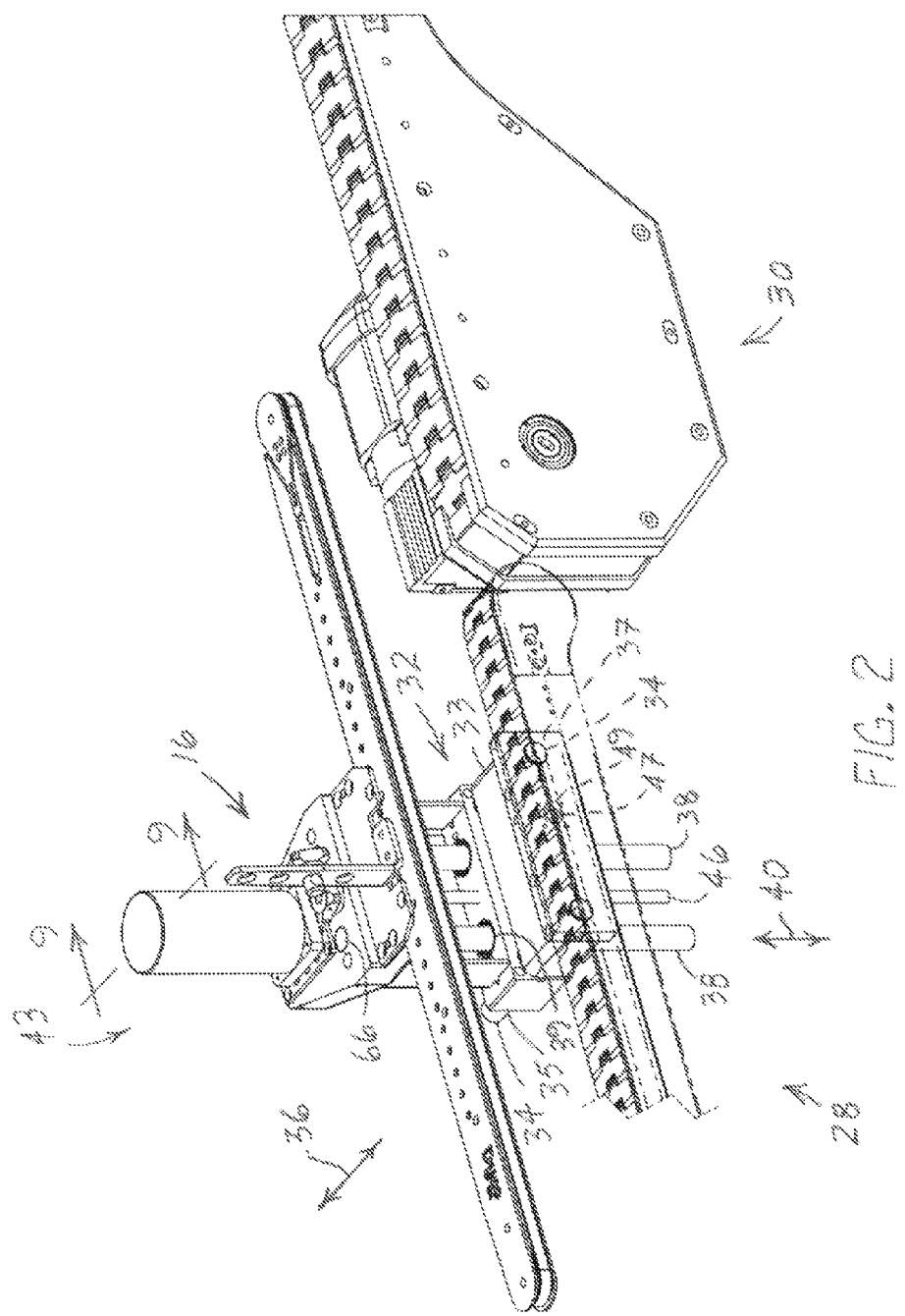
Figure 8A:
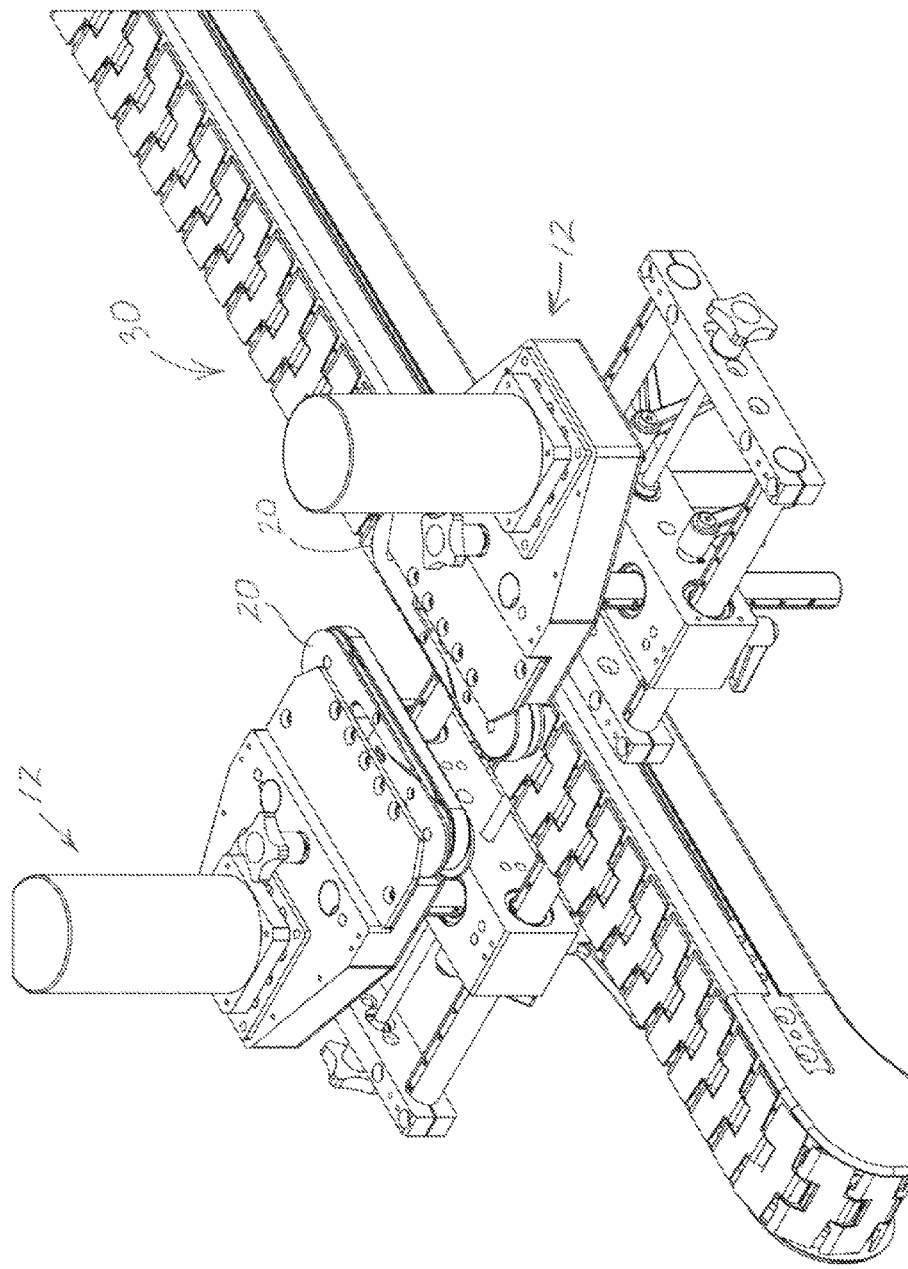
FIG. 8A is a partial upper perspective view of an exemplary device according to the disclosure.

As collectively shown in FIGS. 1-2, an exemplary embodiment of an article metering device 12 for metering articles 50 between adjacent conveyor sections 28, of a conveyor system 10 is now discussed. Article metering device 12 includes a body 16 secured to at least one conveyor section 28 by a support 32 movably secured to body 16. Body 16 is operatively connected to a motor 18 and operatively connected to a belt guide 20. Motor 18 drivingly moves a continuous belt 14 along belt guide 20. Belt guide 20 has a support surface 26 (FIG. 6) extending between opposed ends 22, 24 that likewise sufficiently extends between adjacent conveyor sections 28, 30 and further provides continuous support for articles 50 conveyed over a gap 29 formed between adjacent conveyor sections 28, 30. Although only one article metering device 12 is shown in FIGS. 1-2, as shown in FIG. 8B, a counterpart or second article metering device 12 can be positioned such that corresponding belt guides 20 are substantially aligned between adjacent conveyor sections 28, 30. In one embodiment, such as shown in FIG. 1, only one article metering device 12 can be utilized, having a corresponding opposed immobile surface, such that articles 50 conveyed between opposed ends 22, 24 of belt guide 20 are simultaneously rotated while being conveyed between adjacent conveyor sections 28, 30. FIG. 8A shows a pair of opposed article metering devices 12 positioned over a single conveyor section 30 capable of operating to throttle or controllably meter the flow of articles over the conveyor section. By virtue of the ability to provide continuous, precision support of articles conveyed by a conveyor system, as will be discussed in further detail below, articles, including non-circular, e.g., rectangular, and even including articles having a non-uniform cross section can be conveyed and manipulated, such as providing precision turning or rotational movement to the articles for purposes such as preparation for receiving ink or labeling.

As further shown in FIGS. 1-2, support 32 is securely attached to conveyor section 28, such as by mechanical fasteners (not shown). In one embodiment, support 32 may be securely attached to conveyor section 30. In one embodiment, support 32 may be securely attached to both adjacent conveyor sections 28, 30. Irrespective of the connective arrangement between support 32 and conveyor section(s) 28, 30, the connection between support 32 and the corresponding conveyor section(s) 28, 30 provides a secure and stable or non-moving connection between support 32, and therefore also body 16 and belt guide 20, relative to conveyor section(s) 28, 30. As further shown in FIG. 2, support 32 can include a spacer 33 interposed between support 32 and conveyor section 28.

As further shown in FIGS. 1-2, support 32 includes openings 39 configured to receive corresponding adjustment members 38. Body 16 includes correspondingly aligned openings 66 also configured to receive corresponding adjustment members 38. Body 16 further includes a positioning device 42 operatively connected thereto. Positioning device 42 includes a manually adjustable knob 44 secured to a threaded drive 46 that is received by a mating threaded aperture 48 formed in support 32. In response to rotational movement of knob 44 in one direction about the longitudinal axis of threaded drive 46, body 16 and belt guide 20 are urged into movement in a substantially vertical adjustment direction 40 away from support 32. In response to rotational movement of knob 44 in the other direction about the longitudinal axis of threaded drive 46, body 16 and belt guide 20 is urged into movement in a substantially vertical adjustment direction 40 toward support 32.

As further shown in FIGS. 1-2, support 32 includes openings 35 configured to receive corresponding adjustment members 34, and spacer 33 includes openings 37 configured to receive corresponding adjustment members 34. Support 32 further includes a positioning device 43 operatively connected thereto. Positioning device 43 includes a manually adjustable knob (not shown) secured to a threaded drive 47 that is received by a mating threaded aperture 49 formed in spacer 33. In response to rotational movement of the knob in one direction about the longitudinal axis of threaded drive 47, body 16 and belt guide 20 are urged into movement in a substantially horizontal adjustment direction 36 away from support 32. In response to rotational movement of the knob in the other direction about the longitudinal axis of threaded drive 47, body 16 and belt guide 20 are urged into movement in a substantially horizontal adjustment direction 36 toward spacer 33.

It is to be understood that the openings/apertures formed in body 16 and support 32 that are configured to receive corresponding adjustment members 34, 38 are sized to provide sliding movement therebetween, yet are sufficiently closely toleranced to substantially remove inadvertent relative movement between body 16, support 32, spacer 33 and adjustment members 34, 38 in directions transverse to the sliding movement directions. As a result of such closely toleranced mating connections, for purposes of this disclosure, such connections are characterized as or resulting in conformal fits or the mating connections defining a conformal fit or being conformally received, inadvertent relative movement between belt guide 20 and the corresponding conveyor section(s) 28, 30 is substantially eliminated. In other words, the belt guide is continuously maintained at a predetermined orientation and position relative to an article and adjacent conveyor sections, as well as spacing relative to an opposed surface for supporting the article between adjacent conveyor sections.

Further, an operator is capable of precision adjustment control of belt guide 20 and the corresponding conveyor section(s) 28, 30 by use of positioning devices 42, 43. Positioning devices 42, 43 provide convenient, selective precision adjustment control in two different movement or adjustment directions 36, 40 without requiring partial disassembly of the article metering device, in contrast to conventional article metering devices. In one embodiment, movement or adjustment directions 36, 40 correspond to generally horizontal and vertical directions that are mutually perpendicular to each other. In one embodiment, movement directions can be non-perpendicular to each other. In one embodiment, more than two movement directions (positioning devices) can be utilized, if desired. Such precision and ease of adjustment is lacking in conventional article metering devices. That is, conventional article metering devices require loosening, adjustment, followed by re-tightening of multiple fittings, which is typically cumbersome and awkward, and notably involving a lack of ability to achieve precision control of the location of the belt guide relative to the conveyor section. Such lack of precision control typically requires multiple iterations of such adjustments in order to achieve acceptable component positioning, albeit not precise component positioning. Further, conventional article metering devices do not provide continuous support to articles being conveyed between adjacent conveyor sections as will be discussed in further detail below.

Figure 10:
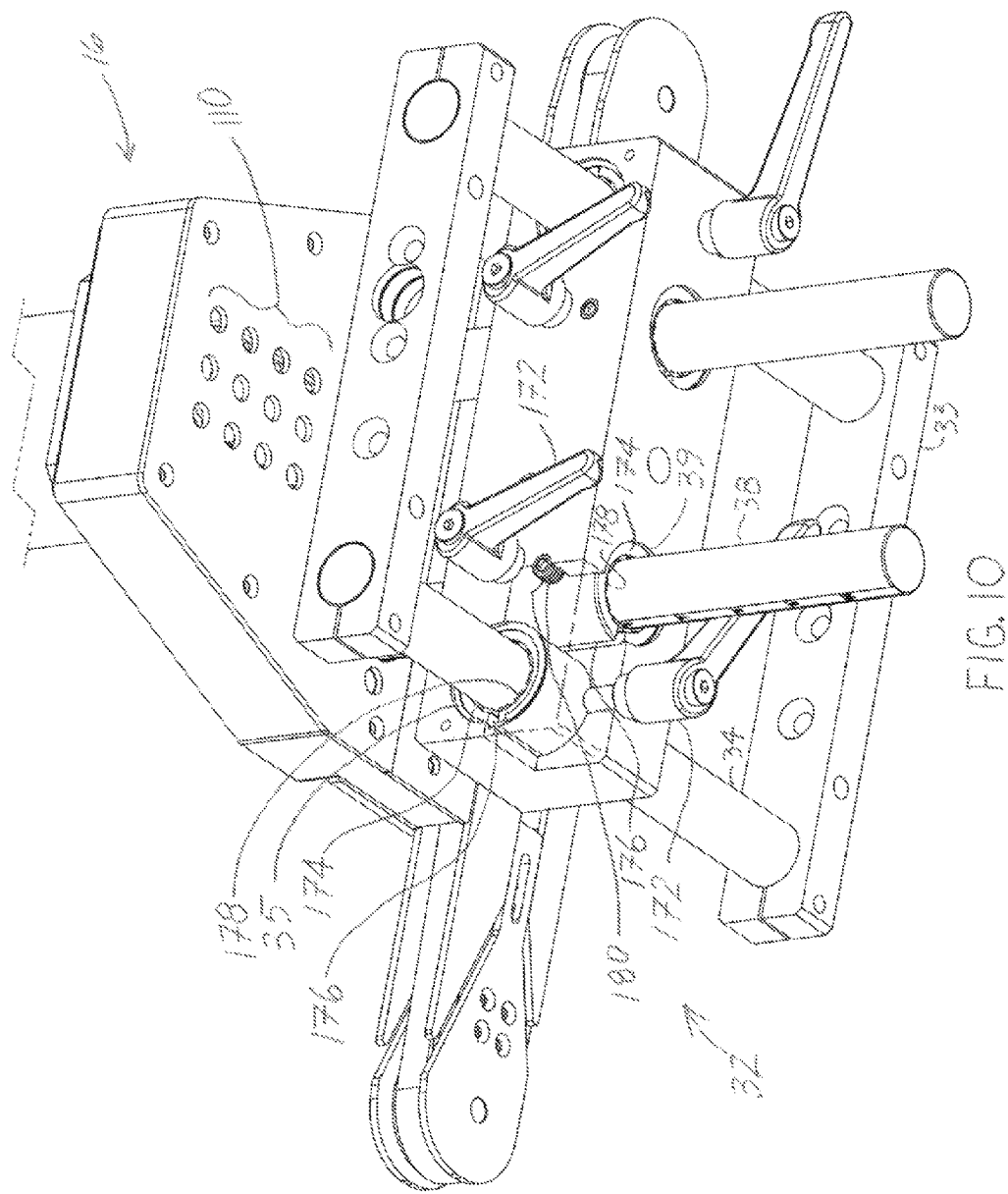
FIG. 10 is a reverse, lower perspective, partial cutaway view of the device of FIG. 2 according to the disclosure.
Figure 11:
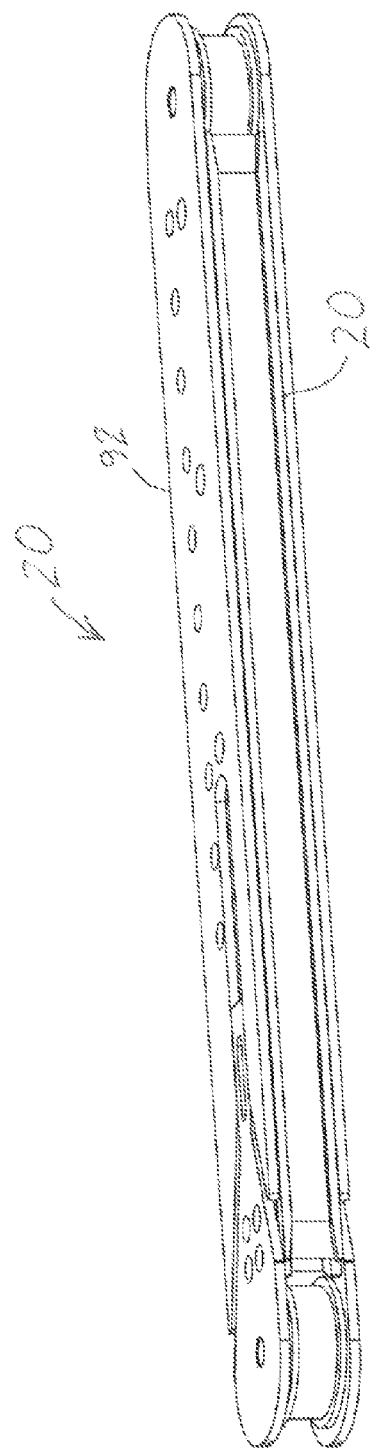
FIG. 11 is an assembled belt guide of FIG. 7 according to the disclosure.

As further shown collectively in FIGS. 1-2 and 10, a selectably variable resistance to movement of body 16 relative to support 32 is now discussed. Such selectably variable resistance to movement relates to frictional resistance to movement between adjustment members 34, 38 and their corresponding bearings mounted in respective openings 35, 39 of support 32. For example, bearing 174 which is mounted in opening 39 includes a slit 176 formed in the body of bearing 174. Bearing 174 includes gripping members 178 radially extending inwardly and facing the outer surface of adjustment member 38. A set screw 180 is installed in support 32 to apply a sufficient compressive force to the housing of bearing 174 to elastically deform the housing of bearing 174, resulting in opposed ends of slit 176 being urged toward each other, and bringing gripping members 178 into frictional contact with the outer surface of adjustment member 38. In one embodiment, bearings 178 are composed of a polymer, such as a plastic, although in other embodiments, the materials of construction of the bearings can be different.

By sufficiently elastically deforming one or more of the housings of bearing 174 with set screw 180, the resistance to movement between corresponding adjustment members 34, 38 can be selectably increased. For example, the resistance to movement between bearing 174 relative to adjustment member 38, which is associated with vertical movement of body 16 relative to support 32, can be selectably adjusted to support the entire weight of body 16 (including the motor 18 and belt guide 20). In other words, in the vertical direction, position locking handles 172 that normally are required to secure body 16 in a fixed vertical position relative to support 32 can be loosened without resultant vertical movement of body 16 relative to support 32, permitting easier positioning of body 16. Otherwise, loosening of position locking handles 172 would result in vertical movement of body 16 relative to support 32, due to gravity, requiring additional vertical force, such as provided by an operator, to maintain the vertical position of body 16 until position locking handles 172 are engaged or tightened. In one embodiment set screw 180 can be installed in support 32 in order to provide variable resistance in one direction (i.e., vertical) only. In other embodiments, set screw 180 can be installed in support 32 in one or more directions, and the extent of resistance can be varied in each direction, as desired, by the operator.

As further collectively shown in FIGS. 1-2, FIGS. 3A and 3B, 4A and 4B, 5A and 5B and 6-7, relative movability between belt guide 20 and body 16 is now discussed. As further shown in the figures, body 16 includes a cap plate 54 having positioning apertures 56 formed therein for receiving fasteners (not shown) such as mechanical fasteners for securing belt guide 20 and body 16 together. As further shown in FIG. 7, belt guide 20 includes opposed caps 94 surrounding a primary structural member 92. Caps 94 include a plurality of positioning apertures 96 that align with fastening apertures 98 of primary structural member 92, permitting assembly of belt guide 20 with mechanical fasteners (not shown). Caps 94 include fastening apertures 58 formed therein to provide selectable alignment with corresponding positioning apertures 56 of cap plate 54 with mechanical fasteners (not shown). In other words, by virtue of fastening apertures 58 formed in caps 94 of belt guide 20 and positioning apertures 56 of cap plate 54, the position of belt guide 20 can be selectably movable relative to body 16. A novel feature of this selectably movable arrangement between belt guide 20 and body 16 involves the ability for belt guide 20 to be moved to a plurality of positions relative to body 16 while continuing to use or maintaining use of the same belt 14. For example, FIG. 3A shows body 16 and belt guide 20 arranged in a first position 60 relative to each another. FIG. 3B shows belt 14 arranged within the corresponding body 16 and belt guide 20 in first position 60. In a different arrangement, FIG. 4A shows body 16 and belt guide 20 arranged in a second position 62 relative to each another. FIG. 4B shows the same belt 14 as depicted in FIG. 3B, except arranged within the corresponding body 16 and belt guide 20 in the second position 62. In yet a further different arrangement, FIG. 5A shows body 16 and belt guide 20 arranged in a third position 64 relative to each another. FIG. 5B shows the same belt 14 as depicted in FIG. 3B, except arranged within the corresponding body 16 and belt guide 20 in the third position 64.

In other words, irrespective the relative position between body 16 and belt guide 20 as secured in position between corresponding positioning apertures 56, 98, the same belt 14 can continue to be used. This ability to re-use or continue to use belts 14 to accommodate different relative positions between body 16 and belt guide 20 provides adaptability from a single configuration of belt guide 20 belt 14 not previously available in conventional article metering device constructions.

In case the gap between adjacent conveyor sections 28, 30 becomes greater than the length of the belt guide, for a conventional article metering device, such a development would have required a replacement article metering device (replacement of the entire unit). However, for the article metering device of the present disclosure, upon replacement of a belt guide of suitable length, as well as a replacement belt usable with the replacement belt guide, the replacement belt and belt guide would permit the modified article metering device to be usable without requiring replacement of other components of the article metering device.

Figure 7:
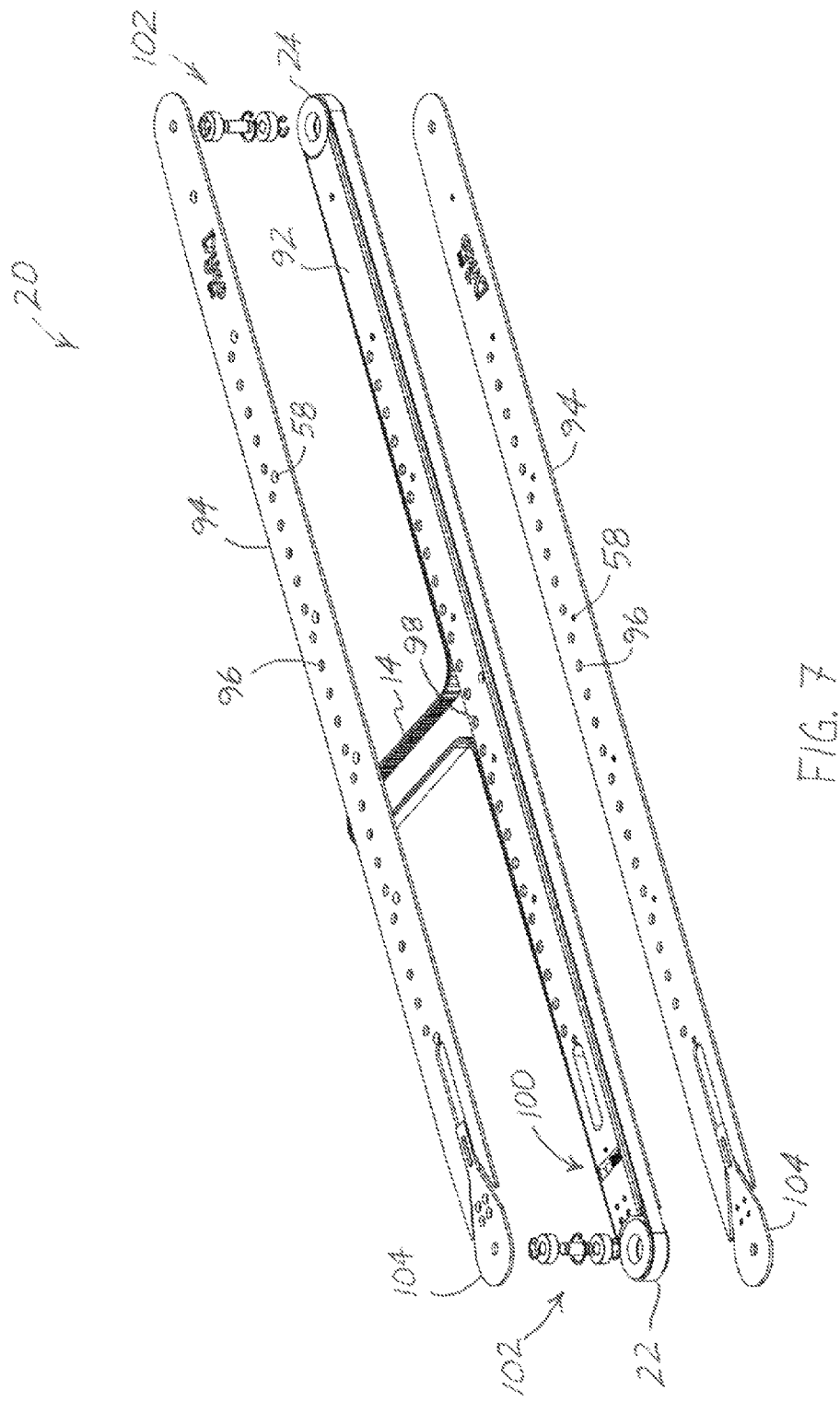
FIG. 7 is an exploded view of an exemplary belt guide of the device according to the disclosure.

As further shown in FIG. 7, belt guide 20 includes opposed ends 22, 24 having roller assemblies 102. In close proximity to end 22, a belt tensioning device 100 is provided for maintaining sufficient belt tension during operation. In one embodiment, belt tensioning device 100 includes a resilient or biasing element. In one embodiment, belt tensioning device 100 includes apparatus for lengthening or shortening belt guide 20. Movable cap portions 104 are movable with roller assemblies 102 relative to corresponding caps 94 to accommodate changes in length as a result of operation of belt tensioning device 100.

Figure 6:
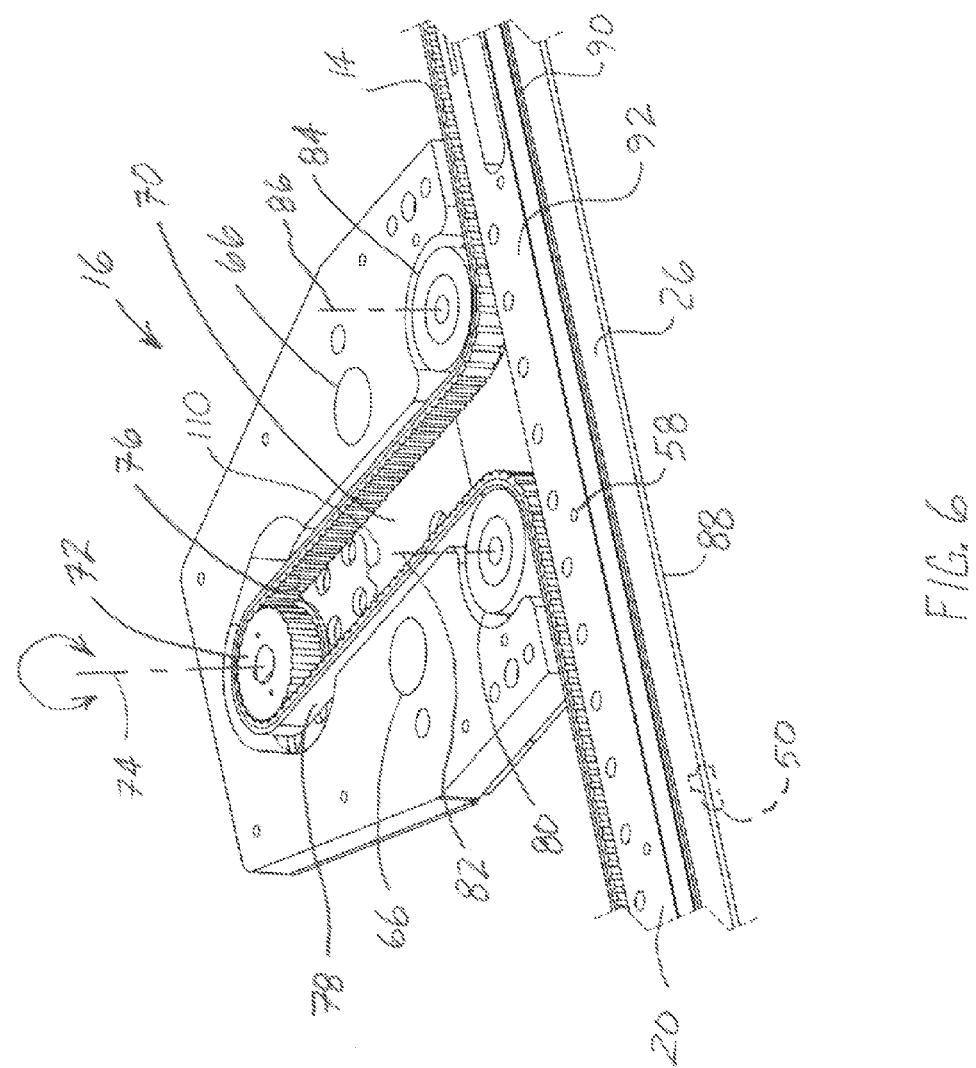
FIG. 6 is an enlarged partial upper perspective cutaway view of the device of FIG. 1 according to the disclosure.

As further collectively shown in FIGS. 1, 6 and 7, an embodiment of the body 16 and belt guide 20 of the present disclosure is further discussed. As further shown in FIG. 6, which is a cutaway view of FIG. 1, body 16 includes a recess 70 formed therein to receive a tooth drive pulley 72 that is urged into driven rotational movement by motor 18 (FIG. 1) about an axis 74. As further shown in FIG. 6, tooth drive pulley 72 includes teeth that are configured to drivingly engage a ribbed inner surface 76 of belt 14. Body 16 further includes a pair of opposed back-bend idler pulleys 80, 84 positioned to engage an outer surface 78 of belt 14, with back-bend idler pulleys 80, 84 configured to rotate about respective axes 82, 86. As further shown in FIG. 6, a loop or portion of belt 14 extends between and is placed in contact with opposed back-bend idler pulleys 80, 84, the end of which loop or portion of the belt 14 extends over tooth drive pulley 72. The remainder of the belt 14 extends around the belt guide 20 (e.g., FIG. 4B). FIG. 6 further shows a portion of belt guide 20 that faces away from body 16, similar to the orientation shown in FIG. 1, except in FIG. 6, the belt 14 has been removed for clarity of the disclosure. The portion of belt guide 20 shown in FIG. 6 shows primary structural member 92 having a flange 88, such as for retention of belt 14, that in the orientation of the belt guide 20 shown in FIG. 1, is proximal to or more closely positioned relative to conveyor section 28, and an opposed flange 90 that is distal or more distantly positioned relative to conveyor section 28 as compared to flange 88. Primary structural member 92 includes a support surface 26 extending between flanges 88, 90.

In operation, inner surface 76 of belt 14 faces support surface 26 and provides continuous support to inner surface 76 of belt 14, with outer surface 78 of belt 14 in contact with article 50. Although only one article metering device 12 is shown in FIGS. 1-2, a counterpart or second article metering device 12 can be positioned such that corresponding belt guides 20 are substantially aligned between adjacent conveyor sections 28, 30. In one embodiment, only one article metering device 12 can be utilized, having a corresponding opposed immobile surface, such that articles 50 conveyed between opposed ends 22, 24 of belt guide 20 are simultaneously rotated while being conveyed between adjacent conveyor sections 28, 30. For either arrangement, as a result of the ability for precision control or placement of belt(s) relative the conveying surface of conveyor section 28 (FIG. 1), low profile articles that previously would not be compatible with conventional article metering devices (e.g., too short), such as less than ¾ inch in height can now be conveyed between adjacent conveyor sections 28, 30. In one embodiment, the articles conveyed by the article metering device can be between about one inch and about ¼ inch in height. In one embodiment, the articles conveyed by the article metering device can be between about ¾ inch and about ⅛ inch in height. In one embodiment, the articles conveyed by the article metering device can be about ½ inch. In one embodiment, the articles conveyed by the article metering device can be between about ½ inch and about ⅜ inch in height. In other embodiments in which the articles are wider than the adjacent conveyor portions, the article height could be about 1/16 inch or less, such as for caps used for extremely small containers.

Figure 9:
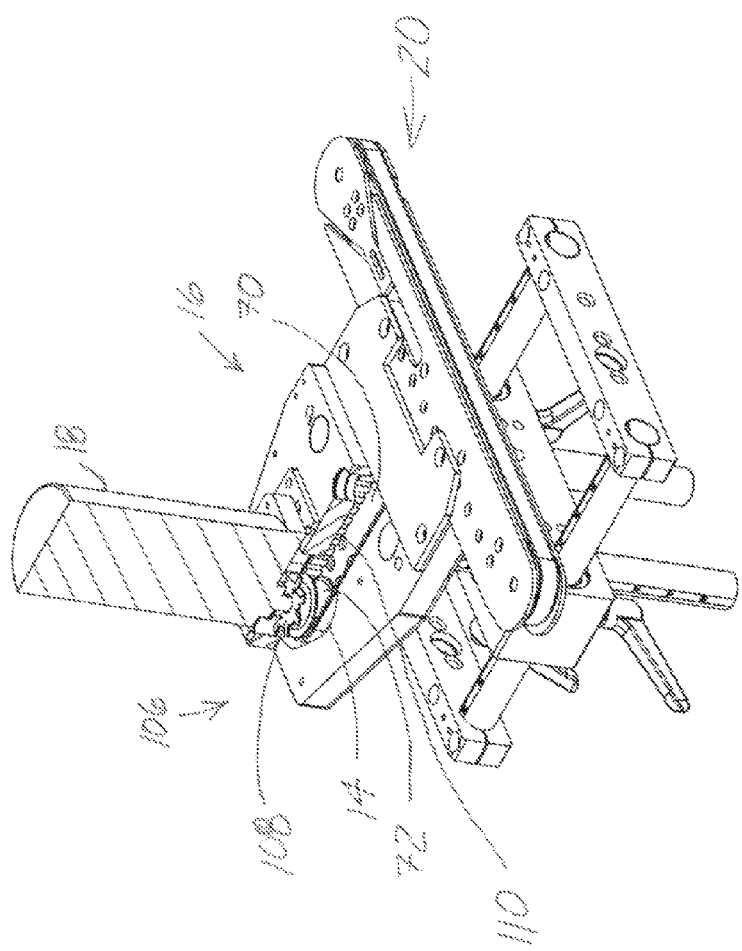
FIG. 9 is a partial cross section taken along line 9-9 of FIG. 2 of the device according to the disclosure.

As further shown collectively in FIGS. 6, 9, and 10, body 16 comprises an air ventilation system 106 further comprising a fan 108 operatively connected to motor 18, such as shown secured to tooth drive pulley 72 (FIG. 9). As a result of air ventilation system 106, belt 14 and associated components can be used in environments having elevated temperatures, including environments in which the articles are conveyed at elevated temperatures possibly exceeding 250° F. In response to rotational movement of the shaft of motor 18 and tooth drive pulley 72 about axis 74, fan 108 is similarly directed into rotational movement about axis 74. By virtue of rotational movement of fan 108, which is in fluid communication with recess 70, air contained in recess 70 is vented exterior of body 16 via openings 110 formed in body 16, thereby cooling belt 14 and associated components. Such cooling is especially beneficial when handling, for example, freshly manufactured articles from a blow molder (not shown) or articles heated for other reasons. For example, in one arrangement, articles are flame surface treated to permit the articles to more easily accept/receive ink or labeling.

FIGS. 11, 12, 13, 14A and 14B collectively show an exemplary embodiment of primary structural member 92 of belt guide 20. Belt guide 20 includes a set of wear surfaces 114, 116 and 118 having a low coefficient of friction, such as associated with Teflon®, a registered trademark of Du Pont De Nemours and Company, provided for guidingly supporting belt 14 (FIG. 9) during operation of the conveyor system. For example, as further shown in FIG. 14B, wear surfaces 114, 116 and 118 are configured to guidingly support belt 14 in at least two directions, such as wear surface 114 providing support in a lateral direction 115 and wear surfaces 116 and 118 providing support in opposed vertical directions 117. It is to be understood that terms such as lateral and vertical are not intended to be limiting, but are provided to more easily explain the operation of components of the present disclosure. Collectively, wear surfaces 114, 116 and 118 are arranged to form a recess 120 in belt guide 20. A web 126 supports wear surface 114 and extends outwardly to opposed flanges 122 which support wear surfaces 116, 118. Flanges 122 further include surfaces 124 facing opposite wear surface 114. Web 126 extends to an insert portion 128 having opposed outer surfaces 130 terminating at an end 132. A slit 134 is formed in insert portion 128, with insert portion 128 further including a pair of opposed chamfered edges 136 associated with end 132. Slit 134 permits opposed outer surfaces 130 in proximity of chamfered edges 136 to move toward each other in response to a compressive force applied to outer surfaces 130.

Figure 14A:
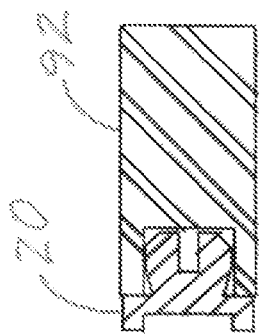
FIG. 14A is a cross section taken along line 14-14 of FIG. 13 of the base portion of the guide belt according to the disclosure.
Figure 14B:
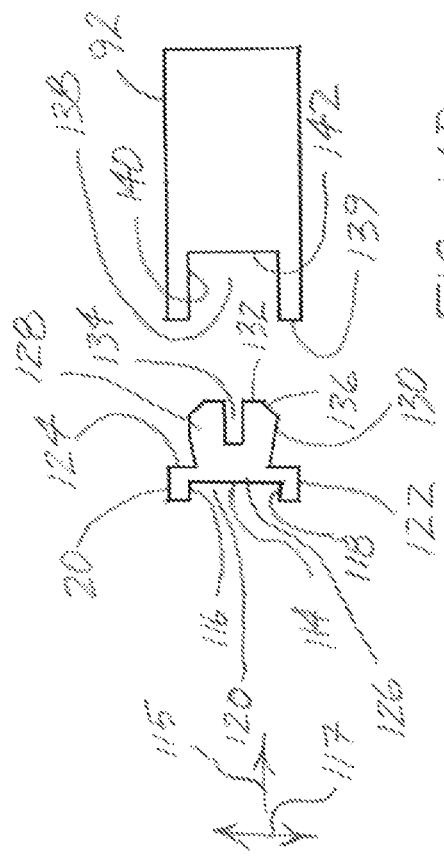
FIG. 14B is an end view of the guide belt of FIG. 12 according to the disclosure.

As further collectively shown in FIGS. 11, 12, 13, 14A and 14B, primary structural member 92 is configured to receive belt guide 20. Primary structural member 92 includes an end 139 into which a channel 138 is formed, channel 138 having facing inside surfaces 140 terminating in a bottom surface 142. Upon sufficiently directing end 132 of belt guide 20 inside of channel 138 of primary structural member 92, which insertion is facilitated by chamfered edges 136 formed in insert portion 128 of belt guide 20, insert member 128 is directed inside of channel 138 of primary structural member 92 until surface 124 of belt guide 20 abuts end 139 of primary structural member 92, such as shown in FIG. 14A. In one embodiment, the distance separating opposed outer surfaces 130 of insert portion 128 is greater than the distance separating inside surfaces 140 of channel 138 of primary structural member 92. As a result, inside surfaces 140 exert a compressive force against opposed outer surfaces 130, causing inside surfaces 140 to move toward each other, providing a press fit arrangement therebetween.

As further shown in FIGS. 12 and 14A, upon alignment of an aperture 146 formed in primary structural member 92 with an opening 148 formed in belt guide 20 along an axis 150, a fastener 144, such as a countersunk bolt, roll pin or the like is directed along axis 150 for securing belt guide 20 to primary structural member 92. In one embodiment, belt guide 20 is composed of a material having a coefficient of expansion/contraction that is different (e.g., greater than) than the coefficient of expansion/contraction of primary structural member 92. In another embodiment, belt guide 20 can be composed of a material having a coefficient of expansion/contraction that is less than the coefficient of expansion/contraction of primary structural member 92. As a result of belt guide 20 and primary structural member 92 being secured together by a single connection, the remaining portions of belt guide 20 and primary structural member 92 are permitted to freely expand/contract relative to one another while primary structural member 92 provides continuous support for belt guide 20 as previously discussed. Such freedom of expansion/contraction would not be permitted by fastening arrangements involving more than one non-slotted fastener, due to the differences of coefficient of expansion/contraction between belt guide 20 and primary structural member 92, which would otherwise result in surface discontinuities of belt guide 20, especially at elevated temperatures. For example, use of two or more non-slotted fasteners to secure belt guide 20 and primary structural member 92 together would result in a rippled or "wavy" contour (e.g., out-of-plane movement) or other discontinuities formed in belt guide 20 (or permanent damage to belt guide 20), due to the inability of belt guide 20 to fully expand between the fastener locations, i.e., belt guide 20 being otherwise constrained by the comparatively reduced expansion of primary structural member 92 in response to an increase in temperature. Further, as a result of properly sizing certain features of belt guide 20 and primary structural member 92 in light of the differences of coefficients of expansion/contraction between belt guide 20 and primary structural member 92, including but not limited to the distance between opposed outer surfaces 130 of belt guide 20 versus the distance between inside surfaces 140 of primary structural member 92, the position and thickness of slit 134 (including an embodiment with more than one slit 134 formed in primary structural member 92), belt guide 20 can be securely supported by primary structural member 92 throughout the range of operating temperatures to which the conveyor system is subjected, while permitting free relative movement of belt guide 20 relative to primary structural member 92.

Figure 15:
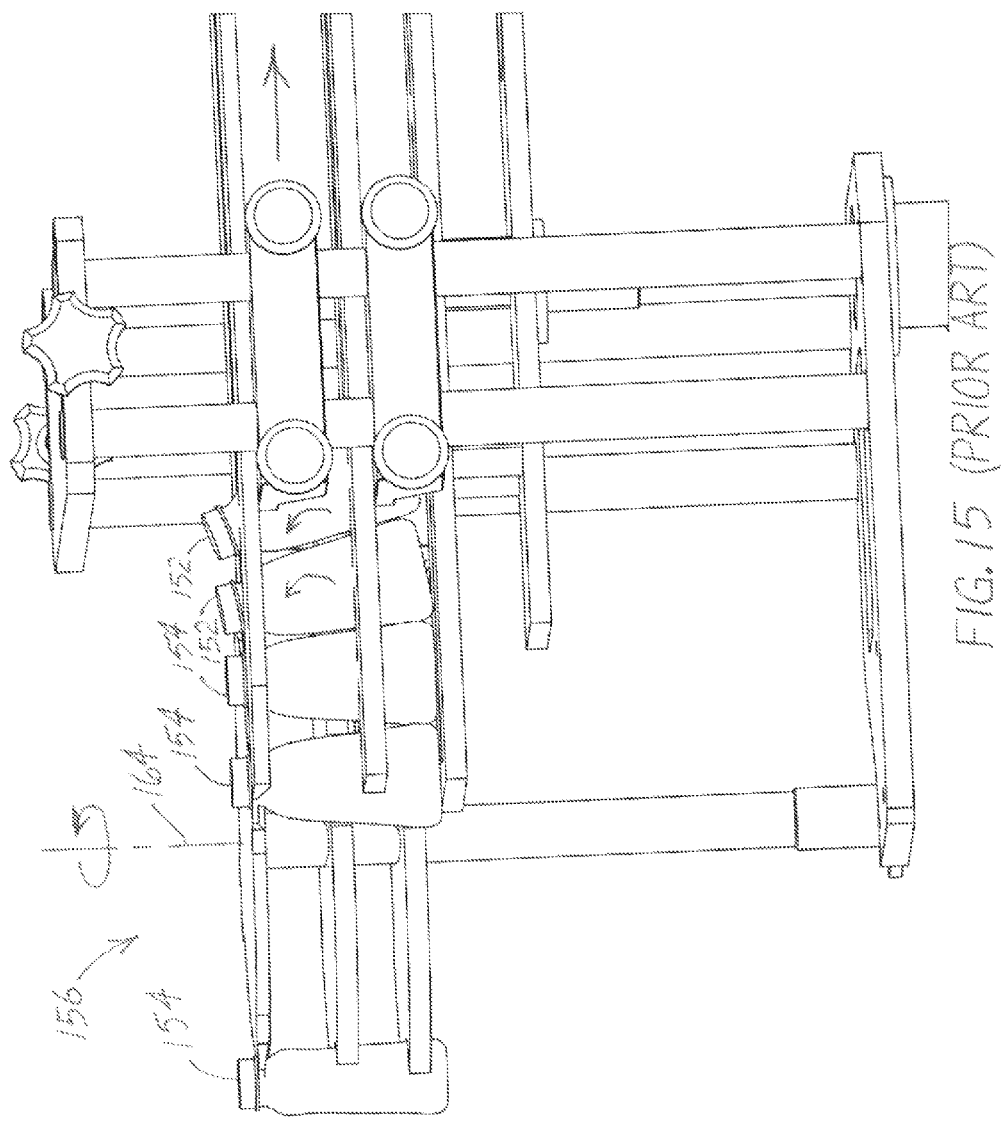
FIG. 15 is an elevation view of irregularly shaped articles tipping on a prior art conveyor.
Figure 16:
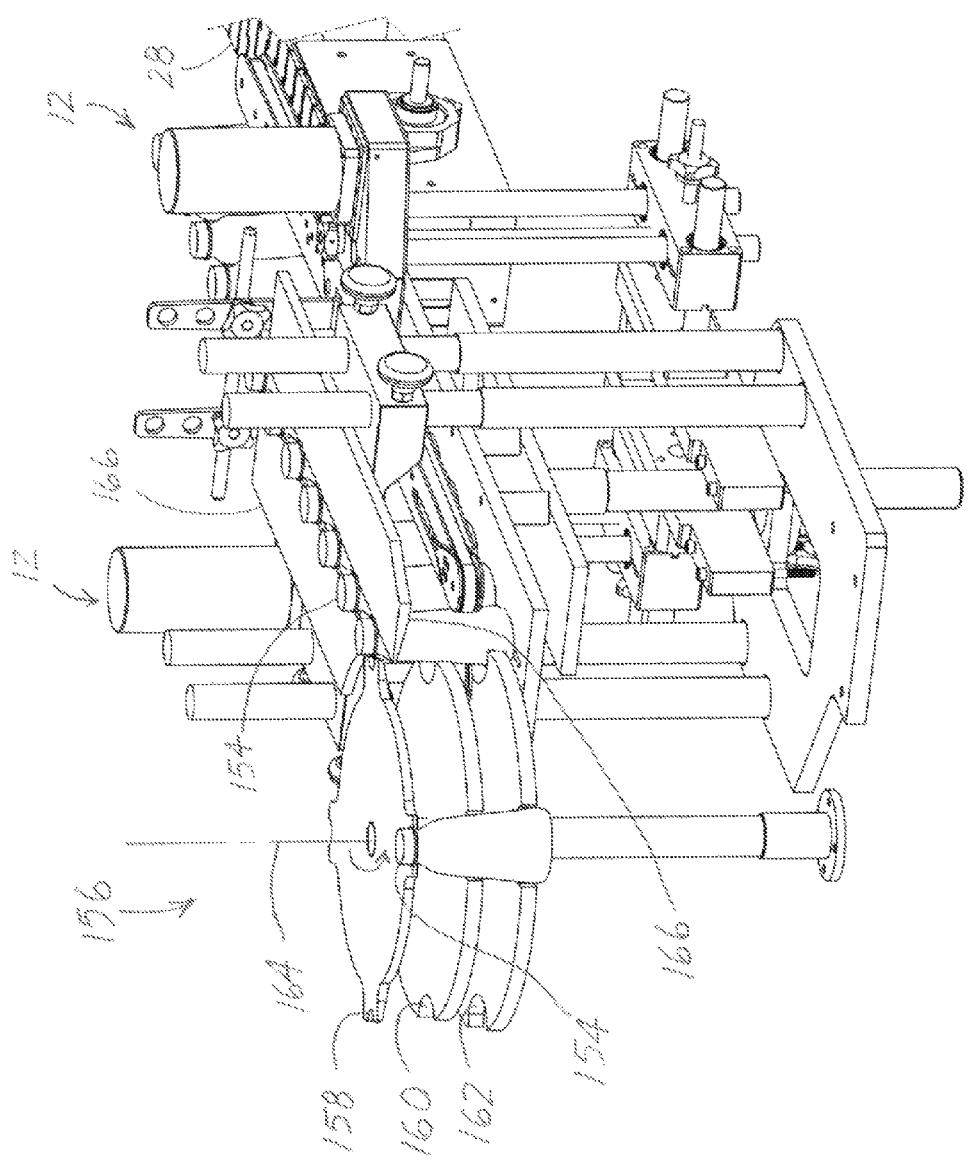
FIGS. 16 and 17 are perspective and plan views, respectively, of an embodiment of a device for substantially preventing tipping of articles on a conveyor system according to the disclosure.
Figure 17:
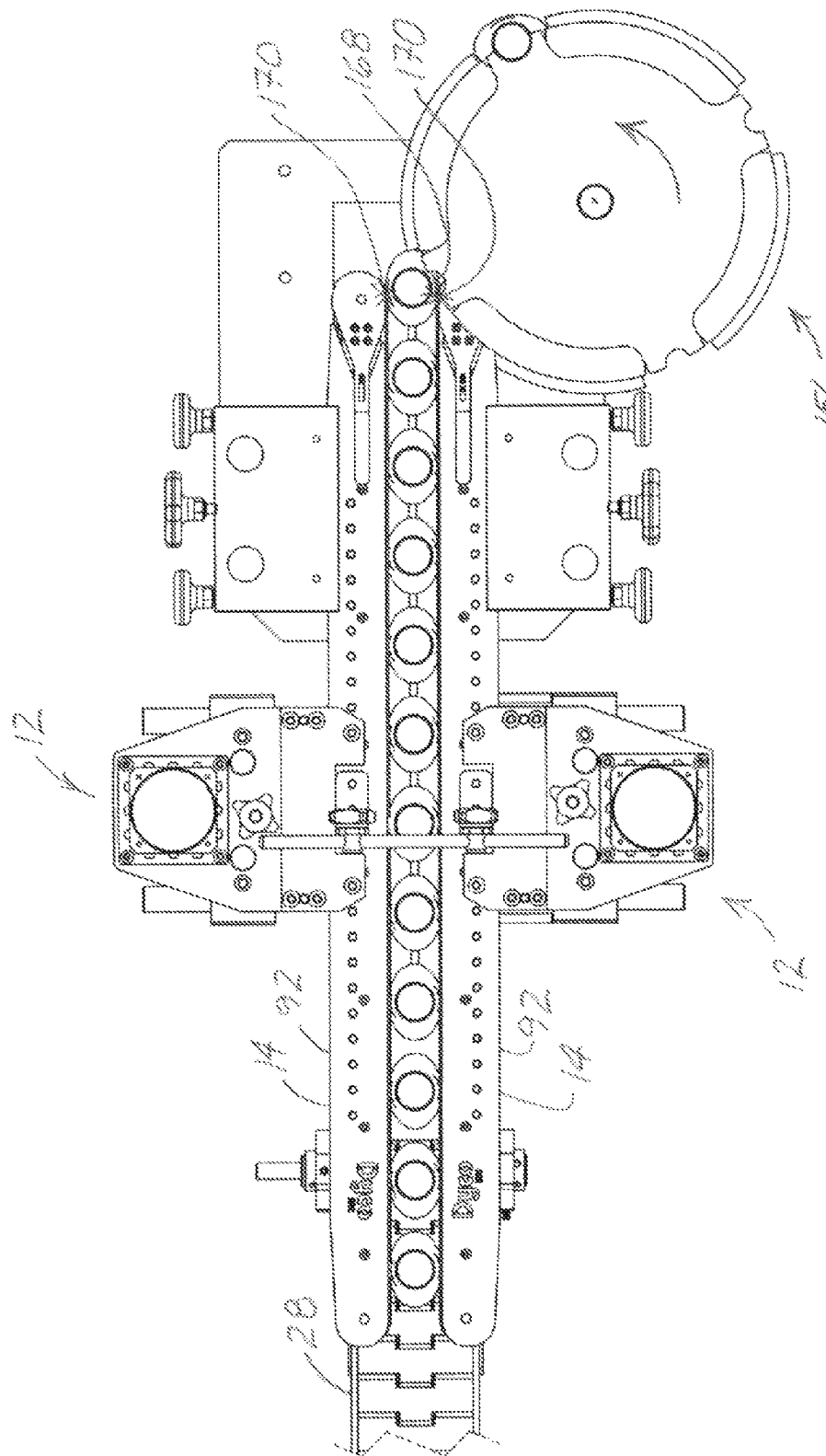

Furthermore, in the art of blow molding, as shown in FIG. 15, a star wheel 156 can be utilized to meter articles 154 at high feed rates along a conveyor system. A star wheel can be utilized to meter articles along a single conveyor section or from one conveyor section to another conveyor section of a conveyor system. For example, as shown in FIGS. 16-17, a star wheel 156 is utilized to meter articles from one conveyor section (not shown) to another conveyor section 28. As further shown in FIG. 16, star wheel 156 can include one or more grooves, such as grooves 158, 160 and 162 configured to engage/secure articles 154 while metering articles 154 at high feed rates by rotating the articles 154 about an axis 164 and onto conveyor section 28.

Unfortunately, there can be challenges associated with metering articles 154 using a star wheel 156, including difficulties associated with maintaining stability of the articles 154 while transferring or removing the articles from star wheel 156 onto conveyor section 28. This difficulty is encountered in conveying arrangements where there is reliance on one article 154 pushing against another article 154 immediately subsequent to disengagement of article 154 by the grooves 158, 160 and 162 of star wheel 156, such as by the neck of article 154. This difficulty is greatly increased in instances in which the articles 154 do not present a suitable surface to push one another through the exit tooling rails 166 (shown in FIG. 16) aligned with conveyor section 28, such as articles 154 having a non-uniform cross section.

For example, articles 154 shown in FIGS. 15-17 have a generally trapezoidal profile, such that jamming of the articles (shown as tipping articles 152 in FIG. 15) can take place immediately after the star wheel 156 releases article 154 (and becoming tipping articles 152), as a result of a lack of continuous engagement/support of the articles 154 subsequent to star wheel 156 release onto conveyor section 28. In this case, positional adjustment of the article metering devices 12 relative to star wheel 156 can be utilized to substantially prevent conditions associated with tipping articles 152. That is, as best shown in FIG. 17, by virtue of precision positional adjustment of article metering device 12 relative to star wheel 156, the metering belts 14 supported by the belt guides 20 (see FIG. 12; not shown in FIG. 17) which are likewise supported by corresponding base portions 92 can be adjusted to engagement positions 170 in close proximity to or that substantially coincides with a release position 168 of articles 154 from star wheel 156. As a result, engagement positions 170 of the metering belts 14 of article metering device 12 substantially simultaneously receive or engage/support articles 154 from release position 168 of star wheel 156, and by maintaining continuous contact/support with the articles 154, star wheel 156 and article metering device 12 are collectively able to controllably maintain the flow of articles between star wheel 156 and discharge conveyor section 28. Such continuous support of articles 154 conveyed or metered between star wheel 156 and article metering devices 12 substantially prevents jamming, tipping or similarly undesirable changes in position/orientation of articles 154 during operation of the conveyor system between star wheel 156 and a corresponding conveyor section 28.

It also should be recognized that the star wheel discharge apparatus is generally found on the highest volume production machines, e.g., in the general order of 5,000 to 10,000 articles per hour, and this issue aggravates high production of difficult articles. When adjusted properly, including providing a proper metering belt conveyor speed, it has been found that due to the operation of the star wheel, in which newly formed articles are released and maintained in position for a brief period of time, such as a few milliseconds, the belt conveyor speed can be set and remain unchanged over a production range of articles, while continuing to operate smoothly.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An article metering device for use in a conveyor system comprising:
   a continuous belt;
   a body;
   a motor operatively connected to the body for drivingly moving the belt; and
   a belt guide having opposed ends operatively connected to and continuously supported by the body in at least two directions, the belt guide having a support surface for continuously supporting the belt between the opposed ends, the belt guide having a different coefficient of expansion/contraction than the body, the belt guide operatively connected to the body such that the belt guide can freely expand/contract relative to the body without distorting the support surface, the belt guide extending between adjacent conveyor sections of the conveyor system or between different positions of a conveyor section of the conveyor system.

2. The device of claim 1, comprising a support operatively connected between the body and the conveyor section, permitting adjustment of the body in at least two directions relative to the conveyor section.

3. The device of claim 2, wherein the support includes at least one opening extending through the support in each of at least two different directions configured to conformally receive corresponding adjustment members, permitting selectable movement of the body in at least one direction of the at least two different directions relative to the support.

4. The device of claim 3, wherein two directions of the at least two different directions are substantially perpendicular to each other.

5. The device of claim 2, wherein the body includes a positioning device operatively connected between the body and the support, each positioning device for providing selectable movement of the body in one direction of at least two different directions.

6. The device of claim 1, wherein the belt guide is selectably movable relative to the body.

7. The device of claim 1, wherein the belt guide is selectably movable relative to the body while maintaining use of the continuous belt.

8. The device of claim 1, comprising a replacement belt guide having a different length than the belt guide, the replacement belt guide using a replacement belt different than the continuous belt.

9. The device of claim 1, comprising an air ventilation system for cooling the belt, the system comprising a fan operatively connected to the motor for venting air exterior of the body through openings formed in the body.

10. The device of claim 3, wherein selectably variable resistance is applied to movement of the body in at least one direction of the at least two different directions relative to the support.

11. A pair of opposed article metering devices for use in a conveyor system, each article metering device comprising:
a continuous belt;
a body;
a motor operatively connected to the body for drivingly moving the belt; and
a belt guide having opposed ends operatively connected to and continuously supported by the body in at least two directions, the belt guide having a support surface for continuously supporting the belt between the opposed ends, the belt guide having a different coefficient of expansion/contraction than the body, the belt guide operatively connected to the body such that the belt guide can freely expand/contract relative to the body without distorting the support surface, the belt guide extending between adjacent conveyor sections of the conveyor system or between different positions of a conveyor section of the conveyor system;
wherein the opposed continuous belts of the pair of opposed article metering devices continuously supporting and metering articles between adjacent conveyor sections of the conveyor system or between different positions of a conveyor section of the conveyor system.

12. The devices of claim 11, each device comprising a support operatively connected between the body and a conveyor section, permitting adjustment of the body in at least two directions relative to the conveyor section.

13. The devices of claim 12, wherein the support for each device includes at least one opening extending through the support in each of at least two different directions configured to conformally receive corresponding adjustment members, permitting selectable movement of the body in at least one direction of the at least two different directions relative to the support.

14. The devices of claim 13, wherein two directions of the at least two different directions are substantially perpendicular to each other.

15. The devices of claim 12, wherein the body of each device includes a positioning device operatively connected between the body and the support, each positioning device for providing selectable movement of the body in one direction of at least two different directions.

16. The devices of claim 15, wherein the belt guide of each device is continuously maintained at a predetermined orientation and spacing relative to one another.

17. The devices of claim 11, wherein the devices are usable with a blow molder star wheel to provide continuous support for an article conveyed between the blow molder star wheel and the devices.

18. The devices of claim 11, wherein the devices are interchangeable.

19. A method of conveying articles along file a conveyor system, comprising:
providing a continuous belt, a body, a motor operatively connected to the body for drivingly moving the belt; and a belt guide having opposed ends operatively connected to and continuously supported by the body in at least two directions, the belt guide having a support surface for continuously supporting the belt between the opposed ends, the belt guide having a different coefficient of expansion/contraction than the body, the belt guide operatively connected to the body such that the belt guide can freely expand/contract relative to the body without distorting the support surface, the belt guide extending between adjacent conveyor sections of the conveyor system or between different positions of a conveyor section of the conveyor system; and
actuating the motor for conveying articles between the conveyor sections or between different positions of a conveyor section of the conveyor system.

20. The method of claim 19, comprising providing the body with a positioning device operatively connected between the body and the support, each positioning device for providing selectable movement of the body in one direction of at least two different directions, the belt guide is selectably movable relative to the body while maintaining use of the continuous belt, the belt guide is continuously maintained at a predetermined orientation and spacing relative to an opposed surface; and
actuating selectively at least one positioning device.

* * * * *